United States Patent [19]
Prasher et al.

[11] Patent Number: 6,027,284
[45] Date of Patent: *Feb. 22, 2000

[54] METHOD AND APPARATUS FOR REMEDIATION OF CONTAMINATED SOIL

[75] Inventors: Shiv Om Prasher, Baie d'Urfé; Darakhshan Ahmad, Ile-Bizard, both of Canada; Benjamin Ugwuegbua, Garner, N.C.

[73] Assignee: McGill University, Montreal, Canada

[ * ] Notice: This patent is subject to a terminal disclaimer.

[21] Appl. No.: 09/256,210

[22] Filed: Feb. 24, 1999

Related U.S. Application Data

[63] Continuation of application No. 09/184,438, Nov. 2, 1998
[60] Provisional application No. 60/064,093, Nov. 3, 1997.

[51] Int. Cl.⁷ .................................. B09C 1/02; B09C 1/10
[52] U.S. Cl. ........................... 405/128; 210/901; 405/258; 435/262.5; 588/249
[58] Field of Search ..................... 210/747, 901; 405/128, 258; 435/262.5; 588/249, 900

[56] References Cited

U.S. PATENT DOCUMENTS

| | | | |
|---|---|---|---|
| 4,465,402 | 8/1984 | Ter Meulen | 405/128 X |
| 4,611,950 | 9/1986 | Russomano | 405/128 |
| 4,842,448 | 6/1989 | Koerner et al. | 405/128 X |
| 4,849,360 | 7/1989 | Norris et al. | 210/747 X |
| 5,037,240 | 8/1991 | Sherman | . |
| 5,120,160 | 6/1992 | Schwengel | . |
| 5,221,159 | 6/1993 | Billings et al. | . |
| 5,228,804 | 7/1993 | Balch | 405/128 |
| 5,252,226 | 10/1993 | Justice | 405/128 X |
| 5,277,518 | 1/1994 | Billings et al. | . |
| 5,348,422 | 9/1994 | Manchak, III et al. | . |
| 5,384,048 | 1/1995 | Hazen et al. | 210/901 X |
| 5,403,119 | 4/1995 | Hoyle | 405/128 |
| 5,435,666 | 7/1995 | Hassett et al. | 405/128 |
| 5,472,294 | 12/1995 | Billings et al. | . |
| 5,653,288 | 8/1997 | Billings et al. | . |
| 5,660,613 | 8/1997 | Bernier et al. | . |
| 5,676,207 | 10/1997 | Simon et al. | 166/268 |
| 5,753,494 | 5/1998 | Hater et al. | 435/262.5 |

*Primary Examiner*—George Suchfield
*Attorney, Agent, or Firm*—Swabey Ogilvy Renault; Robert Mitchell

[57] ABSTRACT

A method of treating a selected volume of soil comprising the steps of providing a pipe network including at least one layer of perforated fluid conduits, inserting the layer of perforated fluid conduits below the selected volume of soil, introducing a selected soil treatment fluid in the selected volume of soil via the perforated fluid conduits, and successively raising and lowering fluid level through the selected volume of soil, thereby ensuring higher extraction and removal efficiencies.

15 Claims, 3 Drawing Sheets

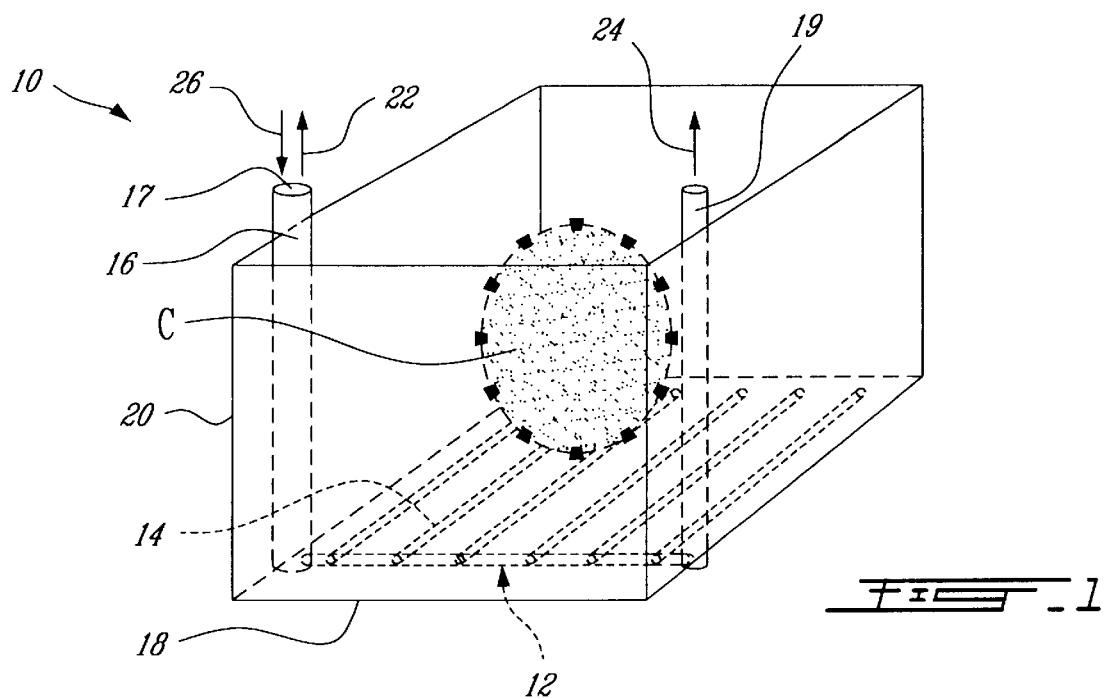
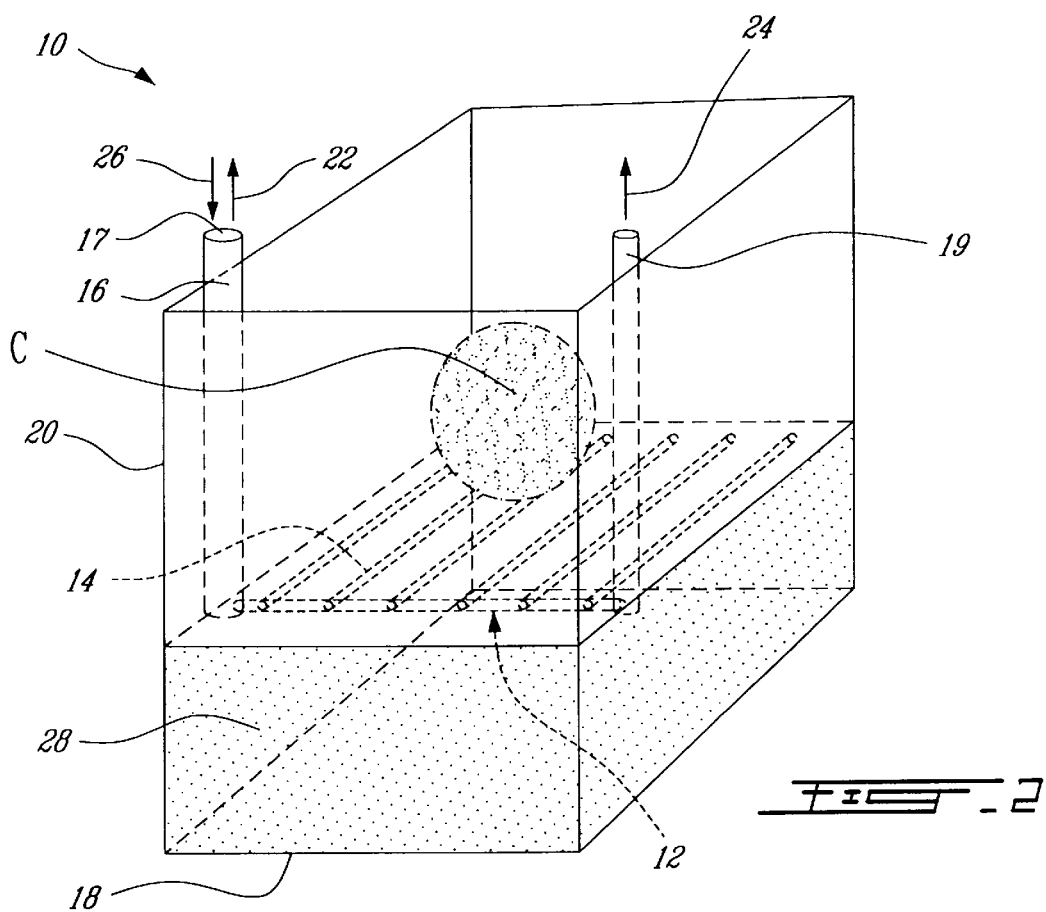

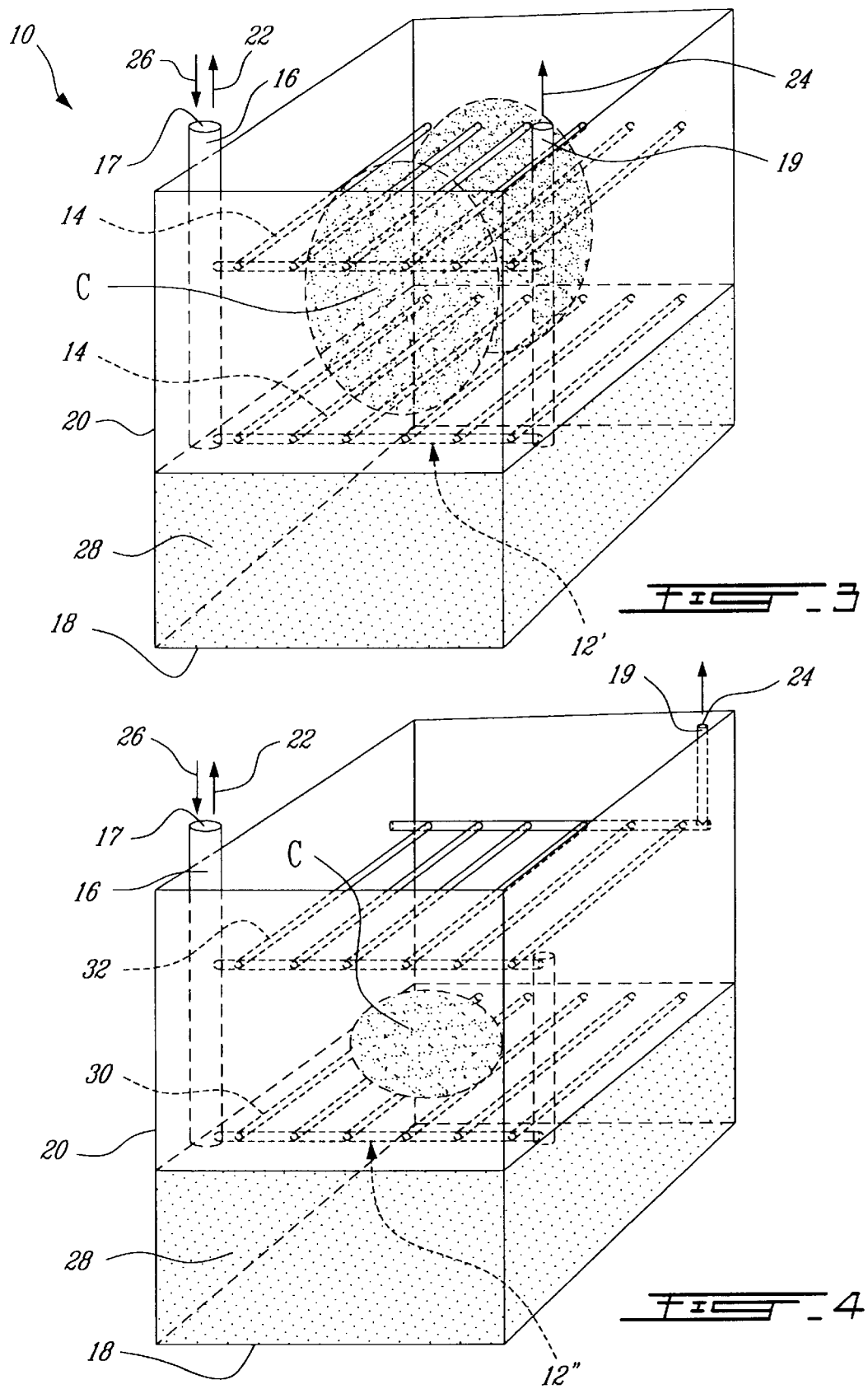

METHOD AND APPARATUS FOR REMEDIATION OF CONTAMINATED SOIL

This is a continuation of application Ser. No. 09/184,438, filed Nov. 2, 1998, which claims the benefit of U.S. Provisional Application No. 60/064,093, filed Nov. 3, 1997.

BACKGROUND OF THE INVENTION

1. Field of the Invention

The present invention relates to the treatment of contaminated soil and, more particularly, pertains to an in-situ/ex-situ method and apparatus suitable for bioremediation of contaminated soils.

2. Description of the Prior Art

In the past, soil washing or flushing has been applied to water soluble contaminants, but for less water soluble hydrocarbons, surfactants added to the wash solutions can help dissolve the contaminants. Recovery of wash solution and contaminant is typically accomplished by the "pump and treat" method. Sometimes, groundwater contamination occurs because of poor recovery or lateral and vertical seepage during an in-situ soil washing operation.

It is also know to exploit microorganisms to detoxify or degrade contaminants. This treatment method is known as bioremediation.

Bioremediation may be effected under aerobic and anaerobic conditions. Major requirements for effective bioremediation are: a biodegradable organic substrate, an appropriate and active microbial community (consortium), bioavailabilty of the polluting substrate to the microorganisms, and the creation of optimal conditions for microbial metabolism. Sometimes bioremediation requires further biostimulation with nutrients or some specific analogue substrate; it may also require bioaugmentation of the microbial community if the site does not have an appropriate indigenous biodegrading population.

The biodegradation of the contaminant is effected by complete mineralization or biotransformation into non toxic, less toxic, or more toxic daughter compounds. Sometimes the biotransformation by-products polymerize and or react with humid substances to become recalcitrant and therefore persist in the environment for a long time.

Land-farming is the simplest aerobic biodegradation technique where the contaminated soil is spread on an agricultural field for biodegradation. Its draw back is the difficulty in optimising the performances of the microorganisms; there is also the possible contamination of subsoil by leachate. This method also requires excavation, transportation, etc.

Other popular aerobic and anaerobic methods are mostly effected on prepared beds or in tank reactors.

In prepared beds, cell surfaces are lined with impermeable barrier boundaries before placing the contaminated soil in the cells. The soil is also conditioned by adjusting the pH and the nutrient status to optimal levels suitable for biodegrading the contaminants. Subsequent addition of supplementary nutrients to the soil may be carried out by sprinkling. Oxygen supply to the biopile is often by diffusion, aided by frequent tilling. Sometimes the prepared bed is instrumented with a network of pipes that receive drain effluent; these pipes are sometimes used for aerating the biopiles as well. Biopiling may be a treatment or a biopreventive measure; when used for prevention, there is usually no impermeable lining.

U.S. Pat. No. 4,850, 745 issued to Hater et al. on Jul. 25, 1989 teaches located prepared beds below storage tanks, which contain viable or dormant organisms capable of degrading the organic compounds of interest. Vertical pipes supply nutrients or nutrient vapours, including air and steam, to the prepared bed located below the ground. Distribution of nutrients and air in the contaminated zone is accomplished by a vacuum, applied on or close to the soil surface. The ground water is not protected from receiving seepage during nutrient addition, or if there is a rainfall event occurring within the treatment period.

This method of nutrient and air supply, via pipes, to prepared bed or biopile is also applicable to bioventing. In bioventing vertical pipes carry nutrient vapour and air into the contaminated subsoil region below the contaminated zone, while vacuum suction applied to extraction wells, at different space intervals, forces the nutrient and air to diffuse across the contaminated region, before being drawn upwards. As the nutrient vapours and air (or steam) are infusing through the soil, low boiling hydrocarbons are stripped and recovered via extraction wells. All nutrients and additives can not be supplied in the vapour phase. This poses a limitation to in-situ bioventing since non vapour nutrients are also required to biostimulate and to create optimal conditions for the biodegrading indigenous microorganisms. Another limitation, envisaged in bioventing, is the poor bioavailability of the organic contaminant to the microorganisms.

Bioavailability of contaminants to biodegrading organisms can be increased by allowing sufficient contact time between the contaminant and the microorganisms. In the presence of optimal moisture content, some microorganisms produce biosurfactants that bring the organic compound into solution. Optimum moisture content, as in a bench slurry microcosm study, should make both transport and metabolism easy. Microbial uptake of substrate is more efficient in solution. However, in bioventing, poor contact time and insufficient dissolution of contaminants results in poor bioavailability of contaminants to the microbial degraders.

It is also known to have an in-situ bioremediation apparatus that can inject nutrient fluids periodically and oxygenated fluid continuously, via horizontal or vertical pipes installed below a contaminant plume. The fluids are then drawn upwards or horizontally under suction, across the plume, so that the nutrient fluid stimulates growth of the indigenous microorganisms within the plume. The nutrient fluid is essentially methane or propane, utilized by methanotrophs. Other nutrients can also be incorporated into the nutrient fluid. The nutrient fluid specifically causes an increase in the indigenous methane degrading population. Afterwards, the nutrient fluid is stopped allowing the increased population to starve and consequently forcing the organisms to cometabolize the contaminants in the plume. Constituents of the oxygenated fluid may be: air or oxygen-nitrogen mixtures, water vapour, or steam.

Although the above-described apparatus is effective in some particular applications, it does not make provision for the protection of groundwater from leachate which are likely to result from a combination of rainfall and treatment of the soil above the ground water.

In another in-situ bioremediation method, the nutrients were introduced via pipes and they percolated through the soil profile based on the geological gradient of the terrain. The percolating nutrients, and sometimes metabolic byproducts from contaminants, were recovered downstream via extraction wells. Since this method relies on the geological gradient, nutrient distribution may be uniform because physical obstructions can divert the flow of the percolating nutrient away from densely contaminated regions. Some nutrients, including phosphates, are needed to optimize in-situ bioremediation and are not easily mobile under normal gradient flow. As well as the poor distribution of nutrients in the soil for in-situ bioremediation, oxygen supply also limits microbial degradation of hydrocarbons in the soil.

In-situ bioremediation has had limited efficiency because of ethical and regulatory constraints as well as technological limitations.

In view of the foregoing, there is a demand for a delivery system adapted to uniformly deliver nutrients, including, oxygen or surfactant or microbes, in the soil profile so that microbial metabolism may be accelerated, thus effecting a successful bioremediation.

SUMMARY OF THE INVENTION

It is therefore an aim of the present invention to provide a system for treating a selected volume of contaminated soil.

It is also an aim of the present invention to provide such a treatment system which is adapted to substantially ensure uniform distribution of soil treatment fluid within the selected volume of contaminated soil.

It is a further aim of the present invention to provide an in-situ/ex-situ treatment system.

It is still an aim of the present invention to provide such a system which is adapted to protect any leachate from reaching ground water.

Therefore, in accordance with the present invention there is provided a method of treating a selected volume of soil comprising the steps of providing a pipe network including at least one layer of perforated fluid conduits, inserting the layer of perforated fluid conduits below the selected volume of soil, introducing a selected soil treatment fluid in the selected volume of soil via the perforated fluid conduits, and successively raising and lowering fluid level through the selected volume of soil.

BRIEF DESCRIPTION OF THE DRAWINGS

Having thus generally described the nature of the present invention, reference will now be made to the accompanying drawings, showing by way of illustration a preferred embodiment thereof, and in which:

FIG. 1 is a schematic perspective view of a system for treating a predetermined volume of soil in accordance with the present invention;

FIG. 2 is a schematic perspective view of the system of FIG. 1 wherein a water buffer is established;

FIG. 3 is a schematic perspective view of a system for treating a predetermined volume of soil n accordance with another embodiment of the present nvention;

FIG. 4 is a schematic perspective view of system for treating a predetermined volume of soil in accordance with another embodiment of the present invention.

DESCRIPTION OF THE PREFERRED EMBODIMENTS

Figure 5:
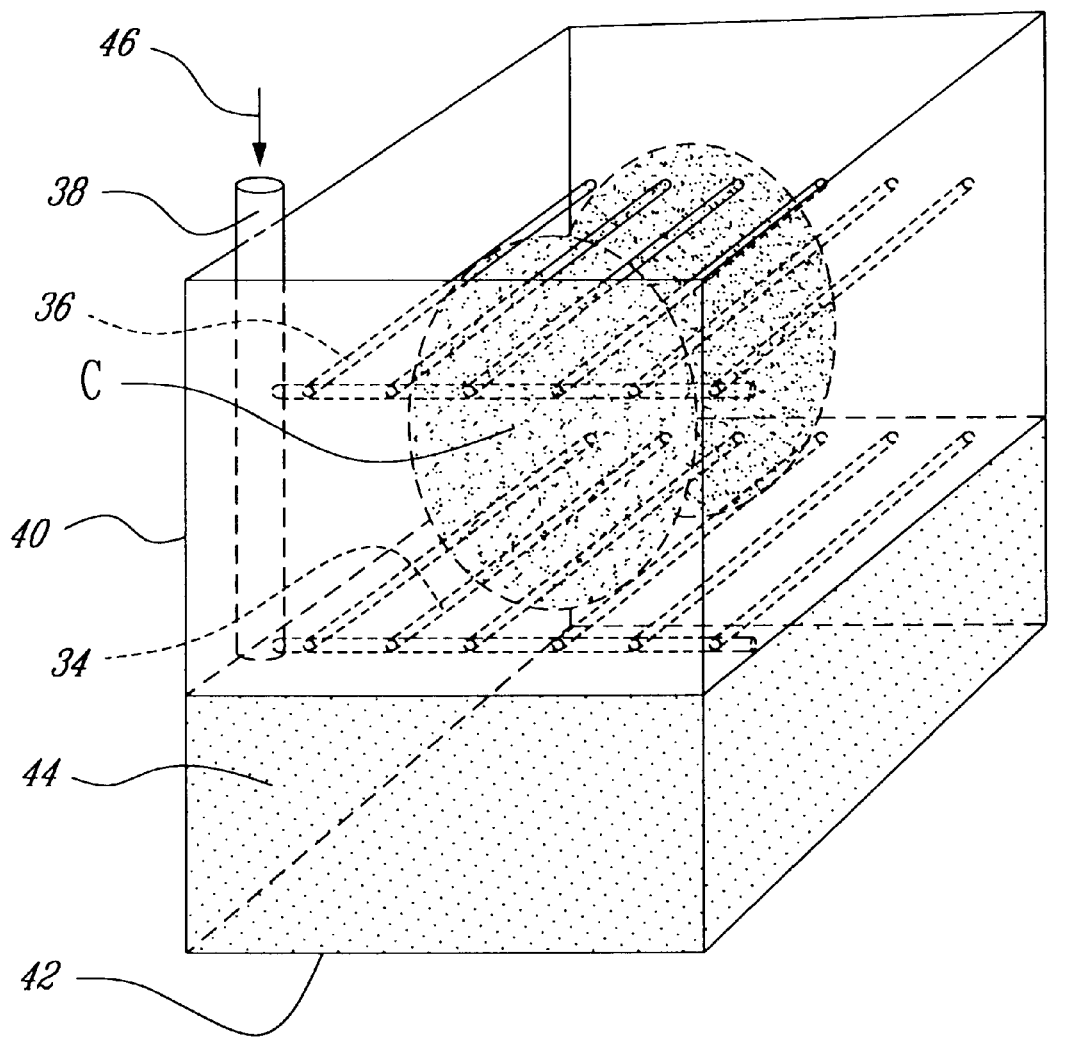
FIG. 5 is a schematic perspective view of a system for treating a predetermined volume of soil illustrating another application of the present invention for quick soil washing using specific solvent which is not only immersible in water but is also lighter than water.

Now referring to the drawings, a method and an apparatus 10 for remediation of contaminated soil embodying the elements of the present invention will be described.

A typical application of the present invention is:

In-situ bioremediation of a hydrocarbon contaminated soil

Four option schematics of the process design of the present invention, which allow for variability in soil texture and adsorption capacity, water table or depth of impermeable layer, localisation and segregation of a depth segment for treatment, and ongoing process manipulation, will be described hereinafter in the context of the above-mentioned application.

As shown in FIG. 1, the apparatus 10 comprises a piping network 12 which is suitable for delivery of nutrients, and/or air or oxygen, and/or surfactant, and/or solvents, and/or microbial inocula to a subsoil. The piping network 12 includes corrugated polyethylene perforated subsurface pipes 14, enrobed with a geotextile filter sock. The perforated subsurface pipes 14 are installed with a lateral spacing ranging from 2 to 10 m. These perforated subsurface pipes 14 serve as a nutrient/surfactant/solvent/inocula, etc., delivery pipe as well as aeration and vacuum suction network. The apparatus 10 further includes a non-perforated branch main 16 which is connected to one side of the perforated subsurface pipes 14. The main 16 includes first and second ends 17 and 19 which are connected to water table control chambers (not shown) above the surface. The perforated subsurface pipes 14 are installed and located with a gradient below the plume of the contaminant, above a water table, on a clayey impermeable layer 18 or a bedrock. The apparatus 10 further includes barriers 20, such as sheet of steel wall or Waterloo barriers, which are sealed at the corners after being driven into the ground to form a low permeability wall that will allow the water table to be maintained within the contaminated zone C, while preventing lateral migration of influent, as will be explained hereinafter. The barriers 20 can also be formed with plastic sheets or any suitable impermeable barrier. The barriers 20 are driven to a relatively impermeable clayey layer 18 or bedrock, which ever is higher. Part of the ground water can be cordoned off. Influent can be forced into the piping network 12 by air pressure or by gravity via the non-perforated branch main 16 and rises to maintain a water table at a desired depth.

The liquid surrounds the contaminant and maintains an interphase between the microorganisms and hydrophobic contaminants as in the laboratory. Using the water table management, the substrate-contaminant and the microorganisms are brought into a close association such that the limitation imposed by the mass transfer of low soluble contaminants to the aqueous phase for enzymatic transformation is overcome. It is possible that an increased water/organic/microbial interface, maintained by water table management, encourages formation of in-situ biosurfactants which is known to improve the bioavailability of hydrophobic contaminants. Gentle agitation is achieved as air or oxygen bubble rises to the surface while maintaining the embodiment under an aerobic condition. The intensity of agitation is determined by the porosity of the soil and the applied air/oxygen pressure. The amount of oxygen dissolved in the liquid phase is determined by the extent of microbial utilization and uniformity of oxygen diffusion to the liquid phase. Withdrawal of aeration creates an aerobic condition within the embodiment. The temperature of the embodiment can be adjusted upwards by heat exchange between a warmed air and the solution in the embodiment. The liquid in the embodiment can be continuously allowed to flow upwards and out via surface drains at a rate close to or higher than the hydraulic conductivity of the soil. While the soil water is moving, it carries and replenishes used or adsorbed nutrients along its path. The moving liquid also carries with it the microbial inocula to other depths.

The liquid/desolubulized contaminant/metabolic byproducts in the embodiment can be lowered by draining via the first end 17 and/or the second end 19 of the main 16, as shown by arrows 22 and 24, using a suction/vacuum pump (not shown). Raising and lowering of the water table helps to redistribute microorganism within the embodiment. During draining, air is drawn through the soil from the surface as the water table is lowered. After draining, aeration is continued by directing pressurized air into the main 16 through the first end 17 thereof, as indicated by arrow 26 or, alternatively, by directing pressurized air through the first end 17 of the main 16 while simultaneously pumping at the second end 19 thereof.

FIG. 2 represents another situation in which the depth to the impermeable layer 18 is very deep compared to the lowest depth of the contaminant. The perforated subsurface drains 14 are still located immediately below the contaminated zone while the water table is raised by water which is injected via the non-perforated branch main 16 to form a buffer zone 28 between the contaminated zone C and the impermeable base 18. The raised water table now forms the platform or stage for the treatment of the contaminated soil above it. The raised water table prevents/minimizes the downward migration and consequent contamination of the lower depths. Nutrient/air or oxygen/surfactant/solvent/microbial inocula delivery can commence after establishing a water buffer zone. On completing the remediation process, the water buffer 28 is drained.

FIG. 3 represents another embodiment in which a plurality of vertically spaced-apart level network of perforated subsurface pipes 14 are disposed in the volume of soil to be treated multiple nutrient delivery at less or greater than 1 meter interval from the surface. This is to facilitate the distribution of nutrient, air, etc. within the contaminated zone C. This is particularly useful when the soil is contaminated from the surface or near the surface to deep zones low in nutrient, air, etc., vertical transport is not efficient, or in clayey soil where the nutrients, particularly phosphorus and trace nutrient compounds and microbial inocula, might not be mobile enough. The piping network 12' will divide the soil into soil columns or segments, each with its nutrient delivery network. The number of segments will be site specific. A water buffer zone 28 can also be established.

Nutrients can be allowed to overflow from a higher level network of perforated pipes 14 to ensure adequate distribution of less mobile nutrients, such as the phosphates and ammonium compounds. Nutrient supply can be continued until estimated nutrient level has been established in the soil segment, the function of the overflow is then reversed to serve as a delivery network to the segment above it.

FIG. 4 shows another embodiment in which the contaminated zone C is isolated for bioremediation between a lower delivery network of pipe 30 and upper draining network of pipes 32. There may or may not be a need for a buffer zone 28, provided the impermeable layer 18 is located below the contaminated zone C. This is particularly useful in treating contaminated soil below buried tanks which are leaking. If it is possible, the tanks are repaired without excavation while the contaminated soil is treated after repairs. The established network could now be left in place to be used should there be subsequent leakages. This will, therefore, serve as an emergency response to prevent leakages from reaching the ground water. The barriers 20 in this case will be equipped with floodgates (not shown) that will allow normal flow of groundwater. However, the gates will be shut during treatment.

As seen in FIG. 4, the first and second ends 17 and 19 of the non-perforated branch main 16 may be disposed on opposed sides of the delivery and draining network of pipes 30 and 32, thereby forming another possible piping network configuration 12".

Another typical application of the present invention is:

In-situ soil washing of contaminated soils

The proposed method for the Soil Washing/Solvent Extraction is to use an organic solvent in the system, that is not only lighter than water but is also immiscible in water. First, a shallow water table is created under the contaminated soil profile in order to minimize the risk of further pollution to ground water. Then a solvent is introduced into the soil profile from the piping network 12 and brought up by the water table slowly. The amount of solvent to clean the soil is calculated based on the mass of contaminant in the soil and its solubility in the solvent (mass/solubility). Water table is raised by subirrigation, until the solvent reaches the top soil and is collected by collection pipes near the soil surface. In this system the soil can be covered by a plastic sheet to prevent volatilization of contaminants or evaporation of the solvent. Finally, the soil is washed with water to take out any solvent residues from the soil.

FIG. 5 illustrates an embodiment of the present invention for delivering solvent into the soil. A network of perforated pipes 34, enrobed with a geotextile filter sock, are installed under ground just below the plume of the contaminant. Spacing between the lateral perforated pipes 34 can range from 2 to 10 m. These perforated pipes 34 serve as both solvent and water delivery pipes. Another set of perforated pipes 36 is installed at the top of the contaminated zone C for the collection of contaminant-solvent solution. A non-perforated branch main 38 is connected to one side of the perforated pipes 34 and 36. The other side of the pipes 34 and 36 is closed by end caps (not shown). One end of the non-perforated branch main 38 is connected to water table control chamber above the surface. Barriers 40, such as sheet of steel wall 7 or Waterloo barriers, which are sealed at the corners after being driven into the ground to form a low permeability wall that will allow water table to be maintained within the contaminated zone C, while preventing lateral migration of influent. The barriers 40 can also be formed with plastic sheets or any suitable impermeable barrier. The barriers 40 are driven to a relatively impermeable clayey layer or bedrock 42 to prevent lateral seepages. When water table is lower than the contaminated zone C, water is added to the system to bring water table near the zone C of contamination, thereby forming a body of water 44 between the contaminated zone C and the impermeable layer 42 within the limits of the barriers 40. A certain amount of solvent, immiscible and lighter than water, is introduced to the soil through the perforated pipes 34 via the main branch 38 as shown by arrow 46. Then water is applied through the same network of perforated pipe 34 to bring it up slowly. A suitable plastic sheet (not shown) is provided to cover the contaminated soil to prevent evaporation of the solvent. Contaminant dissolves in the solvent and the solution is collected through the collection pipes 36. Water table can be lowered by draining via the main branch 38 using a suction/vacuum pump (not shown) and this procedure can be repeated until the soil is remediated. The solvent can be extracted from the contaminant-solvent solution and reused again.

Other Options

1. Estimation of nutrient required makes allowances for adsorption to the soil. A ratio of 100/10/5 (COD/N/P) is used to estimate the needs of the system. However, poor mobility of phosphate entails substantial increases in P level depending on soil adsorption capacity. Optimum level can be established at the startup of bioremediation and maintenance levels added and adjusted as COD decreases with time, and during recycling of effluent.

Typical compounds used for nutrients are nitrogen and phosphate containing compounds. Oxygen can be supplied simultaneously with nutrients by sparging of air or oxygen through the nutrient prior to injection. The system can be operated under a dry and wet cycle mode. In dry cycle, the water is lowered while allowing aerobic conditions to be maintained, although the moisture content might still be high. The extent of anaerobic condition is determined by normal diffusion of air to the soil which had already received nutrients. Duration of either cycle is site specific and is determined on site.

Other optional additives can be included, namely: surfactant to aid in making the contaminant more readily bioavailable, microbial inocula, especially in freshly contaminated soils devoid of adapted microbial population, enzymes for accelerated biodegradation, hydrogen peroxide, other biodegradation enhancers which might be derived or invented in future, etc.

2. Soil sampling for contaminant reduction, nutrient and other additive distribution, microbial population estimation, etc. is obtained through soil coring. The soil can be instrumented for other parameters to monitor the efficacy of bioremediation. These may include: electrical conductivity, redox potential, carbon dioxide evolution, dissolved oxygen, pH, temperature, etc.

3. This invention can be modified to include perforation of the soil from the surface to the delivery network to facilitate nutrient transport. Soil washing can also be undertaken so as to reduce toxic levels of contamination to concentrations that can be handled by microorganisms. Also in situations where soils are contaminated by heavy metals that can be solubilized by chemical manipulation such as modification of soil pH or proper addition of weak organic acids, the delivery system can be used to uniformly deliver the modifiers prior to in-situ soil washing of the contaminated zone C, before embarking on bioremediation.

Finally, it is noted that in relatively shallow conditions the subsurface perforated pipes 14, 30 and 34 may be installed in the soil by using a trencher, as it is well known in the art. Alternatively, holes having consecutive vertical and horizontal portions may be defined in the soil with a drill to permit the insertion of the pipes below the contaminated volume of soil.

What is claimed is:

1. A method of treating a selected volume of soil, comprising the steps of: providing a pipe network including at least one layer of perforated fluid conduits, inserting said layer of perforated fluid conduits below said selected volume of soil, introducing a selected soil treatment fluid in the selected volume of soil via said perforated fluid conduits, and successively raising and lowering fluid level through the selected volume of soil.

2. A method as defined in claim 1, wherein said selected soil treatment fluid include a liquid, and wherein the step of successively raising and lowering fluid level through the selected volume of soil is effected by successively displacing a liquid table in an upward direction and a downward direction through the selected volume of soil.

3. A method as defined in claim 2, wherein said liquid table is raised and lowered by respectively adding and draining said fluid into and away from said selected volume of soil via said layer of perforated fluid conduits.

4. A method as defined in claim 1, further comprising the step of first driving barrier means into the soil down to a substantially impermeable subsoil layer so as to define therewith an enclosure adapted to substantially prevent contaminants from seeping outside of said selected volume of soil.

5. A method as defined in claim 2, further comprising the step of creating a buffer zone between a substantially impermeable subsoil layer and said selected volume of soil for subsequent treatment of the selected volume of soil and wherein said buffer zone has a composition effective for isolating and protecting underlying uncontaminated soil.

6. A method as defined in claim 5, wherein said buffer zone is created by injecting water between said layer of perforated fluid conduits and said subsoil layer so as to obtain a water table forming a platform for treatment of the soil above said water table.

7. A method as defined in claim 1, wherein said pipe network is used as a supply network as well as an aeration and suction network.

8. A method as defined in claim 1, wherein said pipe network includes at least two vertically spaced-apart layers of perforated conduits.

9. A method as defined in claim 8, wherein said layers of perforated conduits include upper and lower layers, and wherein the step of introducing a selected soil treatment fluid in the selected volume of soil is effeted by injecting said selected soil treatment fluid into said lower layer and wherein said method further comprises the step of collecting said selected soil treatment fluid via said upper layer.

10. A method as defined in claim 1, wherein said layer of perforated conduits include a number of laterally spaced-apart horizontal perforated conduits.

11. A method as defined in claim 2, wherein said selected soil treatment fluid further includes a solvent, said solvent being lighter than said liquid and immiscible in said liquid, and wherein said step of introducing a selected soil treatment fluid in said selected volume of soil via said perforated fluid conduits is effected by first supplying a certain quantity of said liquid into said pipe network in order to create said liquid table between said layer of perforated fluid conduits and a substantially impermeable bottom boundary located below said layer of perforated fluid conduits, second injecting said solvent into said selected volume of soil via said pipe network, and third injecting more liquid via said pipe network so as to raise said liquid table until said solvent reaches a top surface of said selected volume of soil.

12. A method as defined in claim 11, further comprising the step of installing collection means for collecting said solvent as it reaches said top surface.

13. A method as defined in claim 11, further comprising the step of providing cover means to prevent volatization of said solvent as it reaches said top surface.

14. A method as defined in claim 1, wherein said selected soil treatment fluid includes a liquid and a bacterial mixture, and wherein the step of introducing a selected soil treatment fluid in the selected volume of soil via said perforated fluid conduits is effected by first introducing said bacterial mixture into the selected volume of soil via said pipe network, second distributing said bacterial mixture in the selected volume of soil by selectively raising and lowering fluid level through the selected volume of soil, and third manipulating at least one of physical, chemical and biological factors of the selected volume of soil to create a desirable environment for biodegradation.

15. A method as defined in claim 14, further comprising the step of creating anaerobic and aerobic conditions in the selected volume of soil by successively raising and lowering said liquid level through the selected volume of soil.

\* \* \* \* \*